J. R. SMITH.
CHAIN CONSTRUCTION.
APPLICATION FILED JAN. 21, 1913.

1,059,913.

Patented Apr. 22, 1913.

Witnesses:

Inventor
J. R. Smith
By his Attorneys

UNITED STATES PATENT OFFICE.

JOSEPH R. SMITH, OF WATERBURY, CONNECTICUT, ASSIGNOR TO WATERBURY BUTTON COMPANY, OF WATERBURY, CONNECTICUT, A CORPORATION OF CONNECTICUT.

CHAIN CONSTRUCTION.

1,059,913. Specification of Letters Patent. Patented Apr. 22, 1913.

Application filed January 21, 1913. Serial No. 743,251.

*To all whom it may concern:*

Be it known that I, JOSEPH R. SMITH, a citizen of the United States, residing at Waterbury, county of New Haven, State of Connecticut, have invented certain new and useful Improvements in Chain Construction, of which the following is a full, clear, and exact description.

My invention relates to an improved chain construction of the type in which the several links are of oval or ball shape, the connection between the adjacent balls being inconspicuous, the entire chain assuming the appearance of a closely strung series of balls or beads. The invention aims at simplicity and economy of production without sacrifice to strength and durability.

Figure 1:
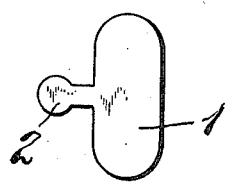
Figure 2:
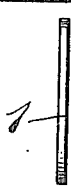
Figure 3:
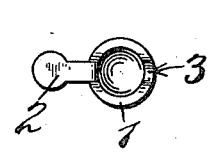
Figure 4:
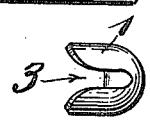
Figure 5:
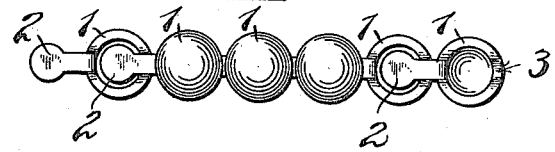

In the drawings Figure 1 is a plan view of a blank such as employed in making the ball and its connection with an adjacent ball. Fig. 2 is an edge view thereof. Fig. 3 is a view similar to Fig. 1, showing the blank partially transformed. Fig. 4 is an edge elevation of the partially transformed blank shown in Fig. 3. Fig. 5 represents a piece of chain with certain links complete and with others only partially complete to show the method of assembling.

Each link is made from a blank comprising the main body 1 and an integral lateral extension or shank 2. The main body 1 is of greater length than width, the longer sides being substantially parallel, the projection 2 extending laterally from the main body 1. The lateral extension 2 has an enlarged head-like end, as plainly seen. The blank is first transformed from its flat shape shown in Fig. 1, to the shape shown in Figs. 3 and 4, in which the main body 1 is cupped in such a manner as to leave a notch or recess 3 in one side thereof opposite to the lateral extension 2. When a plurality of such blanks have been formed, the enlarged end of the lateral extension 2 of one link is placed within a second link with the shank of the extension located in the notch 3 thereof, and then the edges of the second link are rolled in to complete the ball and inclose the enlarged end portion of the first mentioned link, one link after another being added until the chain is of the desired length, or, a plurality of blanks such as shown in Fig. 3 may be strung together and the closing-in operation may occur at once on two or more of the same by the employment of an appropriate tool. By this very simple arrangement I am enabled to make a ball chain with the several links very closely connected by an effective and durable connecting means which furnishes sufficient flexibility for the intended purposes of such a chain. It should be understood that the opening left at the base of the notch 3 of one link in which the shank of the next link is located, should be slightly larger than the shank, but substantially smaller than the enlargement at the end of the shank, the degree of clearance determining the degree of flexibility of the chain.

What I claim is:

1. In a chain construction, a plurality of hollow sheet metal link bodies, each link having an integral shank projecting from one side with an enlarged head thereon and having an opening on the side opposite said shank, the enlarged head of the shank of one link being wholly inclosed within and held loosely but permanently within the hollow portion of an adjacent link.

2. In a chain construction, a plurality of hollow sheet metal link bodies of substantially spherical form, each link having an integral shank projecting therefrom at one side, said shank having an enlarged portion thereon, each link body also having an opening in its side opposite said shank, the enlarged portion of the shank of one link being inclosed wholly within and held loosely but permanently within the hollow spherical body portion of an adjacent link.

3. In a chain construction, a series of units, each unit comprising a closed hollow sheet metal link body substantially spherical in form, an integral shank projecting laterally from said body having an enlarged portion thereon spaced away from said body, said body having a relatively small opening in its side opposite to the integral shank, said opening being of a diameter greater than the smaller part of said shank and smaller than the enlarged portion thereof.

JOSEPH R. SMITH.

Witnesses:
C. B. WILSON,
M. BREWSTER.